United States Patent [19]

Kobayashi et al.

[11] 4,353,002
[45] Oct. 5, 1982

[54] ROTARY ELECTRICAL MACHINE CONNECTED TO HIGH-TEMPERATURE LOAD

[75] Inventors: Hideaki Kobayashi, Sakura; Yasuharu Tamuro, Narashino; Takashi Yasuhara, Yotsukaidomachi; Kunio Ishii, Sakura, all of Japan

[73] Assignee: Hitachi, Ltd., Tokyo, Japan

[21] Appl. No.: 145,230

[22] Filed: Apr. 30, 1980

[30] Foreign Application Priority Data

Jun. 27, 1979 [JP] Japan .................................. 54-80183

[51] Int. Cl.³ .............................................. H02K 7/10
[52] U.S. Cl. .................................. 310/64; 310/75 R; 310/112; 310/58
[58] Field of Search ....................... 64/1 S, 1 C, 1 R; 310/58, 61, 64, 261, 112, 75 R, 75 D

[56] References Cited

U.S. PATENT DOCUMENTS

| | | | |
|---|---|---|---|
| 2,226,986 | 12/1940 | Welchsberg et al. | 310/58 X |
| 2,694,157 | 11/1954 | Cone | 310/64 X |
| 2,735,027 | 2/1956 | Formhals et al. | 310/64 X |
| 2,910,600 | 10/1959 | Young | 310/64 X |
| 3,914,631 | 10/1975 | Guzman et al. | 310/75 R |

Primary Examiner—Donovan F. Duggan
Attorney, Agent, or Firm—Antonelli, Terry & Wands

[57] ABSTRACT

A rotary electrical machine connected to a rotary machine heated to high-temperature, such as a heater roll used for processing fibers, a ventilation fan for ventilating a high-temperature furnace, etc., includes a rotary shaft journaled by bearing means of the rotary electrical machine including a first member formed of material of low thermal conductivity for supporting a rotor, and a second member formed of material of high hardness constituting an output end portion of the rotary shaft remote from the bearing means. The first member and the second member are united together in a position located opposite the rotor with respect to the bearing means and spaced apart from the bearing means. Cooling means, such as a heat dissipating fan, heat dissipating fins, etc., is mounted on a portion of the rotary shaft between the vicinity of the joint of the two members and the bearing means. By this arrangement, a rise in the temperature of the bearing means of the rotary electrical machine can be avoided when the machine is connected to a rotary member of high-temperature, and the rotary member can be connected and disconnected readily and positively.

6 Claims, 3 Drawing Figures

ROTARY ELECTRICAL MACHINE CONNECTED TO HIGH-TEMPERATURE LOAD

BACKGROUND OF THE INVENTION

1. Field of the Invention

This invention relates to a rotary electrical machine connected to a rotary member heated to high temperature, such as a heater roll used for processing fibers, a ventilation fan for ventilating a high-temperature furnace, etc.

2. Description of the Prior Art

One example of a rotary member heated to high temperatures is a heater roll used for processing synthetic fibers. The heater roll is operative to have synthetic fibers wound thereon in several convolutions for transferring them while imparting suitable tension and heat thereto, so as to thereby give a desired thickness to the synthetic fibers.

The heater roll heated to high temperature is directly connected to a rotary shaft of a rotary electrical machine to be driven thereby. In such heater roll apparatus, precautions presently to be described should be taken. First, it is necessary to cool bearing means journaling the rotary shaft of the electrical machine sufficiently to avoid the trouble which would otherwise occur when the heat of the heater roll is transferred to the bearing means through the rotary shaft and heat the bearing means to shorten the grease life. A proposal has been made to use a cooling mechanism which provides a cooling liquid recycling passage around the bearing means as means for avoiding a rise in the temperature of the bearing means and prolonging its grease life. Some disadvantages are associated with such cooling mechanism of the prior art. The cooling mechanism is complex in construction in a portion thereof near the bearing means, requires additional equipment, such as a circulation pump for recycling the cooling liquid, and increases cost. Also, when such cooling mechanism is used, the heater roll is also cooled as cooling of the bearing means is continued, so that the heating efficiency of the heater roll is reduced and the fibrous products are deteriorated in quality. In addition, such heater roll is required to be detached from the rotary shaft of the rotary electrical machine, to carry out inspection and/or repair of the heater roll or a heater used in combination with the heater roll. Thus it is necessary to select material of suitable hardness for the rotary shaft of a rotary electrical machine which is difficult to damage a portion of the rotary shaft which is fitted to the heater roll, so that the heater roll can be reassembled with a high degree of precision at all times. However, if an alloy steel of high hardness, such as chrominum steel, chromium-molybdenum steel, nickel-chrominum steel, etc., is used for this purpose, the heat of the heater roll will be transmitted in increased amounts to the bearing means because such alloy steel for machine structural use generally has high thermal conductivity. Thus when such alloy steel for machine structural use is used for producing a rotary electrical machine, it is necessary to cool the bearing means sufficiently to prolong its grease life and at the same time heat the heater roll sufficiently to enable fiber processing to be performed as desired. Such heater roll apparatus would be very high in operation cost.

SUMMARY OF THE INVENTION

This invention has as its object the provision of a rotary electrical machine of novel structure connected to a high-temperature load, wherein heat of the rotary member is difficult to transmit to bearing means for journaling a rotary shaft of the electrical machine even if material of sufficiently high hardness is used for maintaining the precision finish of the end portion of the rotary shaft.

Outstanding characteristics of the invention are that the rotary shaft of the rotary electrical machine is composed of two members or a first member formed of material of low thermal conductivity adapted to be journaled by bearing means, and a second member formed of material of high hardness and constituting an output end portion of the rotary shaft at which a rotary member is connected to the shaft, and cooling means is mounted on a portion of the rotary shaft between the vicinity of the joint of the first member and the second member and the bearing means so as to avoid direct transmission of heat from the rotary member to the bearing means.

DESCRIPTION OF THE PREFERRED EMBODIMENTS

Figure 1:
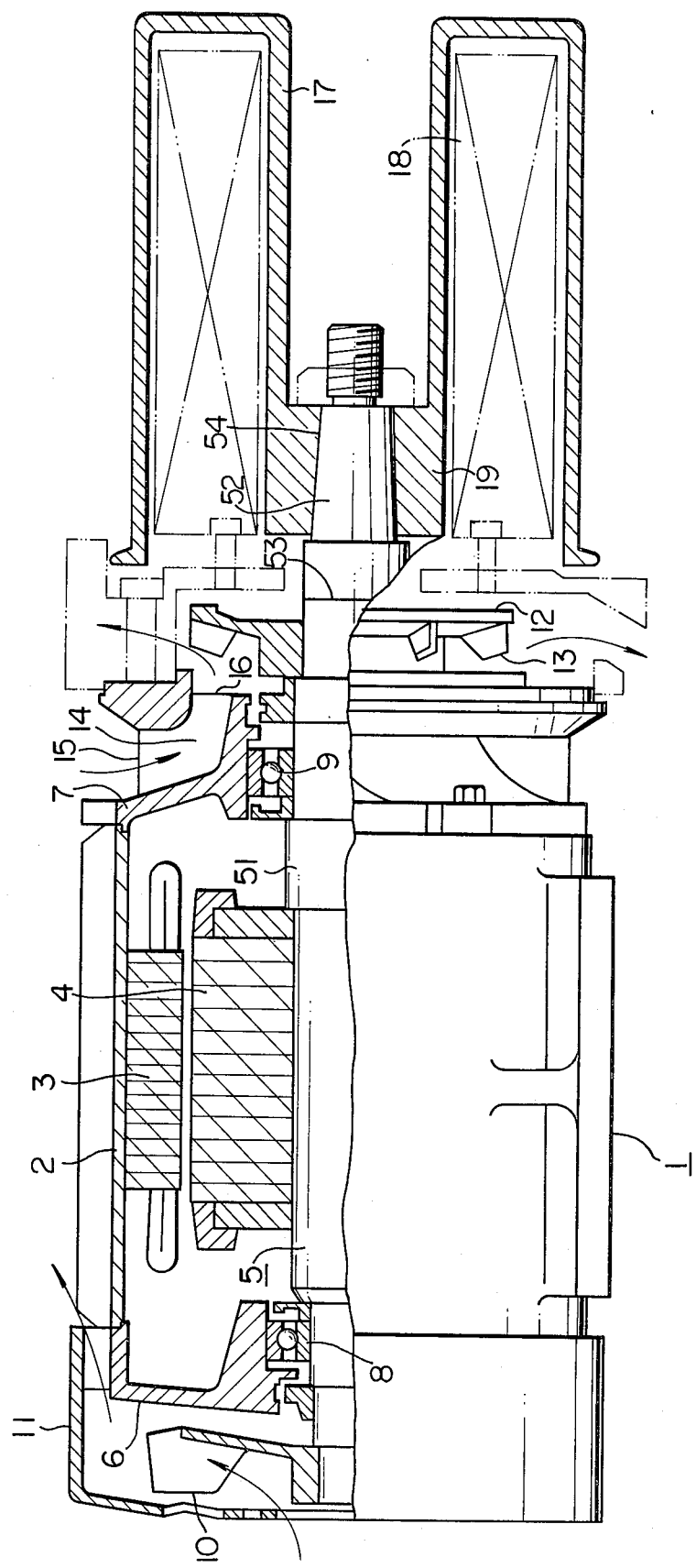
FIG. 1 is a schematic view, with certain parts being shown in section, of the rotary electrical machine connected to a high-temperature load comprising one embodiment of the invention wherein the load is a heater roll.

FIG. 1 shows one example of the rotary electrical machine for driving a heater roll for processing synthetic fibers to reduce the thickness thereof. When a rotary electrical machine drives a member which, like the heater roll, must be driven in synchronizm with another machine, the rotary electrical machine selected for the purpose is usually of the type which has a rotor provided with permanent magnets embedded therein. The numeral 1 designates a synchronous motor comprising a tubular housing 2, a tubular stator 3 contained in the housing 2, a cylindrical rotor 4 disposed inwardly of the stator 3 and juxtaposed thereagainst, the rotor 4 including a cage winding and permanent magnets embedded in an iron core, a rotary shaft 5 extending through the rotor 4 journaled by ball bearings 8 and 9 mounted between end brackets 6 and 7 closing opposite open ends of the housing 2 and the rotary shaft 5 respectively, a cooling fan 10 attached to an end of the rotary shaft opposite to the end thereof at which a load is connected to the rotary shaft 5, and a fan guide 11 for releasing along the outer surface of the housing 2 outdoor air sucked by the cooling fan 10 into the fan guide 11. The numeral 12 designates a heat dissipating fan formed of material of high thermal conductivity, such as aluminum alloy, mounted on a portion of the rotary shaft 5 interposed between the bearing 9 and the output end of the rotary shaft and having a plurality of vanes 13 projecting toward the end bracket 7 and extending radially. The numeral 14 designates a bent air passage formed in the end bracket 7 and having two openings, one opening 15 disposed radially of the cylindrical surface of the end bracket 7 and the other opening 16 being substantially parallel to the rotary shaft 5 near the shaft 5 and directed to the vanes 13. Thus when the heat dissipating fan 12 is activated, outdoor air is sucked through the opening 15 into the air passage 14 and released through the opening 16. The air released through the opening 16 is discharged radially of the heat dissipating fan 12 along same. The numeral 17 designates a heater roll of cup shape for giving a desired thickness to the synthetic fibers by winding in several convolutions the synthetic fibers on its cylindrical surface and transferring same while imparting suitable heat and tension thereto. The heater roll 17 is connected to an output end of the rotary shaft 5. The numeral 18 designates a tubular heater contained in the heater roll 17 for heating the heater roll 17.

Figure 2:
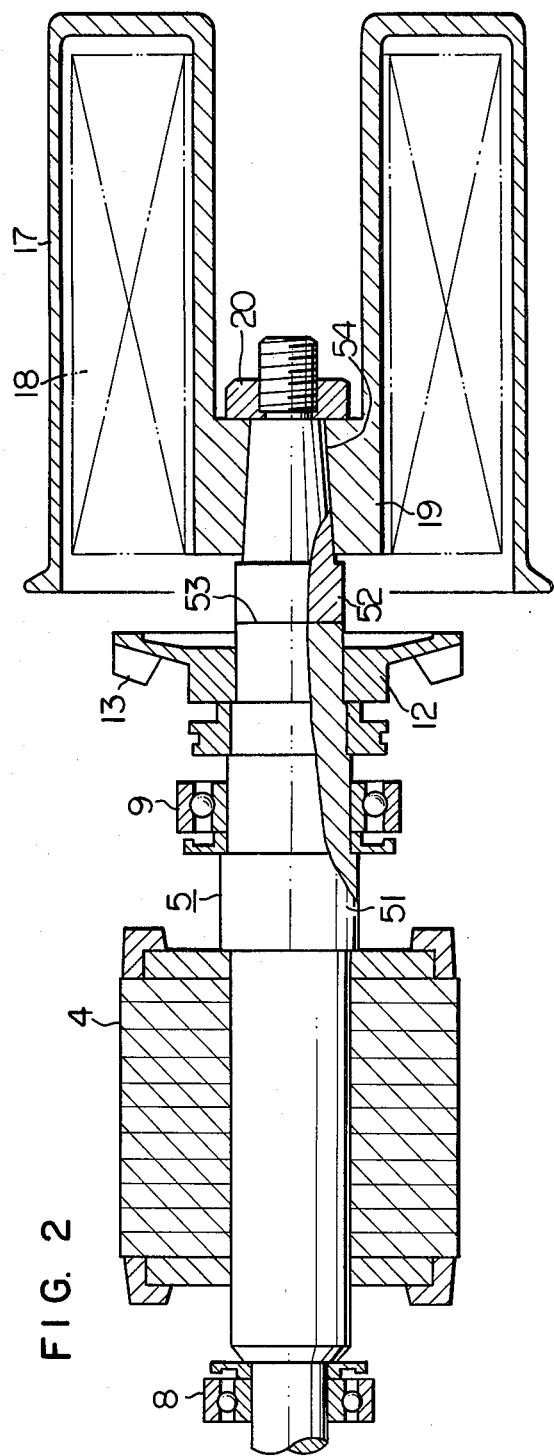
FIG. 2 is a schematic view, with certain parts being taken away for clarity, showing in detail the cooling means in relation to the rotary shaft of the embodiment shown in FIG. 1.

The features characteristic of the embodiment of the invention shown in FIG. 1 will be described in detail by referring to FIG. 2. The rotary shaft 5 includes two portions or a first member 51 and a second member 52. The first member 51, which is journaled by the bearings 8 and 9 to support the rotor 4, is formed of nonmagnetic material of low thermal conductivity such as stainless steel. The second member 52, which is joined to the first member 51 at its output end and located opposite the rotor 4 with respect to the bearing 9, is formed of material of sufficient hardness. The material for forming the second member 52 is selected from the group of alloy steels for machine structural use consisting of chromium steel, chrominum-molybdenum steel and nickel-chromium steel. The two members 51 and 52 are joined into the single rotary shaft 5 by a friction pressure welding process wherein opposite ends of the two members 51 and 52 are abutted against each other and at least one of the two members 51 and 52 is rotated to produce heat by friction for joining the two members together. When the friction pressure welding method is used for joining the two members 51 and 52 together, a joint 53 is formed in a position on the rotary shaft 5 opposite the rotor 4 with respect to the bearing 9 and spaced apart from the bearing 9. That is, the position of the joint 53 is selected in such a manner that the heat dissipating fan 12 can be mounted on a portion of the rotary shaft 5 near the bearing 9 and the joint 53. The numeral 54 designates a tapering portion of the second member 52 which has its diameter gradually reduced in going toward the output end of the second member 52 to enable the heater roll 17 to be connected to the rotary shaft 5 without any play by making the tapering match the inclination of an opening formed in a hub 19 of the heater roll 17. The numeral 20 designates a clamping nut for securing the heater roll 17 to the output end of the second member 52.

The operation of the constructional form of the invention described hereinabove will be described. The synthetic fibers on the processing line are wound in several convolutions on the heater roll 17 after a current is passed to the heater 18 and the synchronous motor 1 is started. The tension imparted to the synthetic fibers can be varied depending on the rotational speed of the synchronous motor 1, so that processing of the synthetic fibers can be continued by varying the diameter and length of the synthetic fibers as desired. At this time, heat of the heater roll 17 is transmitted to the first member 51 of the rotary shaft 5 via the second member 52 thereof and the joint 53. Since the heat dissipating fan 12 is cooled at all times by a current of air produced thereby, the heat transmitted to the first member 51 is released through the heat dissipating fan 12 into the air current produced by the fan 12. Thus the amount of heat transmitted via the joint 53 to the first member 51 is minimized because the first member 51 is formed of material of low thermal conductivity, and the heat transmitted to the first member 51 is released to atmosphere through the heat dissipating fan 12 by means of the heat dissipating fan 12 of high thermal conductivity. In this way, transfer of heat from the heater roll 17 to the bearing 9 is minimized.

When the rotary shaft 5 is composed of two members 51 and 52 and the heat dissipating fan 12 is mounted in a portion of the rotary shaft 5 interposed between the vicinity of the joint 53 and the bearing 9, it is possible to select material of high hardness for the output end portion of the rotary shaft 5 and material of low thermal conductivity for the rest of the rotary shaft 5 which is difficult to transmit heat from the load. Therefore, even if the load is removed from the rotary shaft 5 for maintenance and inspection, the load can be connected to the rotary shaft again with a high degree of precision because the output end portion of the rotary shaft is difficult to damage. The bearing 9 is capable of supporting the rotary shaft 5 to permit safe operation of the synchronous motor 1 because the bearing 9 is difficult to transmit heat from the load. The presence of a portion of the first member 51 of low thermal conductivity between the second member 52 and the heat dissipating fan 12 avoids cooling of the heater roll 17, to enable the latter to operate with high efficiency.

Figure 3:
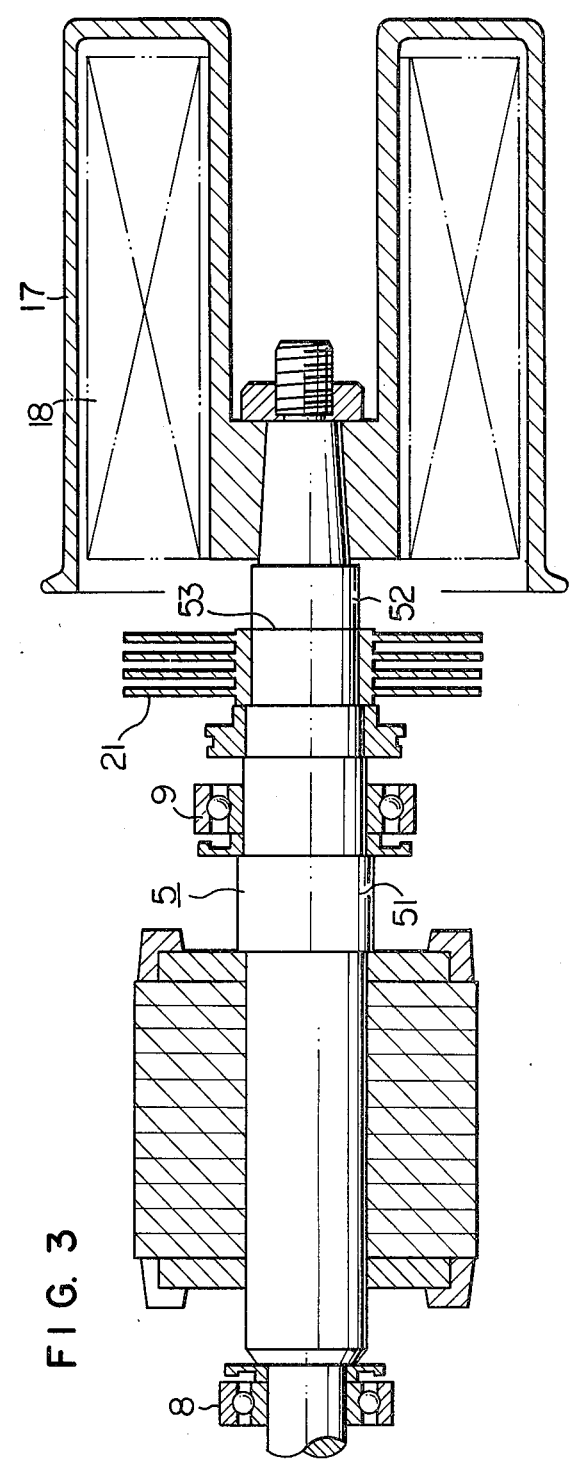
FIG. 3 is a schematic view, with certain parts being taken away for clarity, showing in detail the cooling means in relation to the rotary shaft of another embodiment.

FIG. 3 shows another embodiment of the invention. The embodiment shown in FIG. 3 is distinct from the embodiment shown in FIGS. 1 and 2 in that the heat dissipating fan 12 is replaced by a multiplicity of fins 21 as cooling means. More specifically, in the embodiment shown in FIG. 3, the heat dissipating fins 21 formed of material of higher thermal conductivity than the first member 51 of the rotary shaft 5, such as aluminum alloy, are arranged on the rotary shaft 5 in a portion thereof between the vicinity of the joint 53 and the bearing 9. By this arrangement, transfer of heat from the heater roll 17 to the bearing 9 can be minimized. In the embodiment shown and described hereinabove, the rotary electrical machine is a synchronous motor. It is to be understood, however, that the invention is not limited to this specific form of motor and that any other motor, such as a DC motor, induction motor, etc., can serve as a rotary electrical machine according to the invention. Also, in the embodiments shown and described hereinabove, the rotary electrical machine has been described as being connected to a heater roll for processing the synthetic fibers. It is to be understood that the invention is not limited to this application and that the rotary electrical machine according to the invention can be used for driving a ventilation fan for effecting ventilation of a high-temperature furnace, for driving a runner of a pump for handling fluids of high-temperature or for any other similar purpose.

What is claimed is:

1. In a rotary electrical machine for use with a high-temperature load comprising:
   a tubular stator;
   a cylindrical rotor disposed within said stator;

a rotary shaft secured to said rotor and extending through said rotor; and bearing means located outside said rotor for journaling said rotary shaft;

the improvement comprises:

a first member formed of a first material of low thermal conductivity constituting a portion of said rotary shaft journalled by said bearing means and supporting said rotor;

a second member formed of a second material of high hardness constituting an output end portion of said rotary shaft remote from said bearing means;

a joint uniting said first member and said second member together located opposite said rotor with respect to said bearing means; and cooling means mounted on said first member between the vicinity of said joint and said bearing means and being formed of a material having a thermal conductivity greater than that of the material of said first member.

2. A rotary electrical machine as claimed in claim 1, wherein said cooling means comprises a fan.

3. A rotary electrical machine as claimed in claim 1, wherein said cooling means comprises a multiplicity of fins.

4. A rotary electrical machine as claimed in claim 1, 2 or 3, wherein said first member is formed of stainless steel and said second member is formed of an alloy steel of machine structural use selected from the group consisting of chromium steel, chromium-molybdenum steel and nickel-chromium steel.

5. A rotary electrical machine as claimed in claim 1, 2 or 3, wherein said joint is formed by frictional pressure welding.

6. A rotary electrical machine as claimed in claim 1, 2 or 3, wherein said cooling means is formed of a material having a thermal expansion coefficient which is substantially equal to that of the material of said first member.

* * * * *